United States Patent [19]
Law et al.

[11] Patent Number: 5,775,986
[45] Date of Patent: Jul. 7, 1998

[54] COOKED MEAT PULLING APPARATUS

[75] Inventors: Ronald Law, Astoria; Michael Maki, Seaside; John Niemann, Astoria, all of Oreg.

[73] Assignee: Carruthers Equipment Co., Warrenton, Oreg.

[21] Appl. No.: 795,683

[22] Filed: Feb. 5, 1997

Related U.S. Application Data

[63] Continuation-in-part of Ser. No. 626,713, Mar. 29, 1996.
[51] Int. Cl.$^6$ ........................................ A22C 9/00
[52] U.S. Cl. .................. 452/141; 366/294; 366/325.2
[58] Field of Search ........................ 452/135, 141; 366/294, 325.2, 303, 224, 205

[56] References Cited

U.S. PATENT DOCUMENTS

| | | | |
|---|---|---|---|
| 62,899 | 3/1867 | Stanton | 366/294 |
| 2,289,613 | 7/1942 | Weinreich | 366/294 |
| 3,539,117 | 11/1970 | Sjogren | 366/325.2 |
| 4,515,483 | 5/1985 | Müller et al. | 366/303 |
| 4,797,004 | 1/1989 | Buschbom | 366/224 |
| 4,878,627 | 11/1989 | Otto | 366/205 |
| 5,207,991 | 5/1993 | Gerking | 366/294 |

*Primary Examiner*—Willis Little
*Attorney, Agent, or Firm*—Robert L. Harrington

[57] ABSTRACT

An apparatus for pulling a cooked meat product into individual strands. A preferred embodiment including a feed roller set that compresses a cooked meat product to initially start the separation process and controllably delivers the food product to a feed station. An auger in the feed station delivers the food product into a rotating drum. Longitudinal rakes are rotatably mounted in the drum and during rotation will engage and elevate the food product. As the food product is elevated the food product will be delivered into the rotational path of a rotating puller bar that is rotatively mounted and driven in the drum. The rotating bar will separate the food product into strands and propel the food product against the surface of the drum. The strands will sift through the rakes and progress toward the exit end of the drum with the remaining large pieces being elevated by the rakes to be delivered into the path of the puller bar. Radial baffles are provided at intervals along the length of the drum to the control the rate of travel of the food product along the drum. The inclination of the drum is adjustable to control the rate of travel of the food product within the drum.

18 Claims, 3 Drawing Sheets

COOKED MEAT PULLING APPARATUS

This application is a Continuation In Part of patent application Ser. No. 08/626,713 filed Mar. 29, 1996.

FIELD OF THE INVENTION

This invention relates to an apparatus for shredding or pulling apart of cooked muscle fiber.

BACKGROUND OF THE INVENTION

Meat products such as chicken, turkey, beef, pork and fish are prepared in several different forms for human consumption. One form is pulled or shredded which is the form often served as filler meat for tacos, barbecue sandwiches, stew, etc. The degree of separation of the muscle fiber and/or size reduction and individual user definition will dictate whether the product is termed pulled or shredded. As a result, hereinafter "pulled" and/or "shredded" will be referred to as pulled. The texture of pulled product is different than more conventional forms such as sliced or ground meat. In essence, meat products have a grain-like structure and when cooked and then pulled apart, the meat separates along the grain lines into strands of the meat which is referred to as being pulled.

Whereas meat slices and ground meat has heretofore been automatically produced, the pulling process has been largely manual. Different tools and devices have been developed for pulling the muscle fibers apart, however the tools or devices used to rip or pull the meat apart tend to sever the muscle strands rather than separate the strands. The tools utilized were variations of tools that were used to slice or cut the food product. The tools and devices, in order to penetrate the muscle fiber, were somewhat sharp or pointed and tended to cut or slice the food product strands rather than simply separate the strands during the separation process. The present invention has for its objective to automate the process of pulling without severing or cutting the muscle strands.

BRIEF SUMMARY OF THE INVENTION

The present invention is an apparatus for separating a cooked meat product such as beef, pork and/or poultry into individual muscle fiber strands. The food product to be pulled in a preferred embodiment is fed through a set or sets of feed and compression rollers which initially compresses the meat product and tends to initially separate the muscle fiber strands of the meat product. The meat product is then fed into a rotating drum. Individual longitudinal rakes are mounted in the drum and are rotatively driven at a higher rate or near the same rate as the drum. A puller bar mounted within the drum is rotatively driven at a high rate within the drum. The puller bar has radially extending fingers along its longitudinal length. The longitudinal rakes tend to lift the meat product upwardly and as they reach an elevation, they will slide off the rakes and will be delivered onto the puller bar. The puller bar as it is rotated will impact the meat product to separate the meat product into individual muscle strands or fibers and propel the product against the drum surface. The drum is adjustably mounted such that its angle of inclination may be varied to control the rate at which the food product travels through the drum so that the food product will be separated into a desired consistency. Radial baffles are provided in the drum as well as the rakes to control the rate of flow of the food product through the drum.

The above is particularly suited for continuous feeding of a food product although the apparatus may be utilized for batch processing wherein only a certain amount of the food product is fed through the apparatus.

Other embodiments of an apparatus suited for batch processing of a food product has a rotating puller bar mounted in a drum or container in which the food product to be pulled is introduced.

DESCRIPTION OF THE PREFERRED EMBODIMENT

Figure 1:
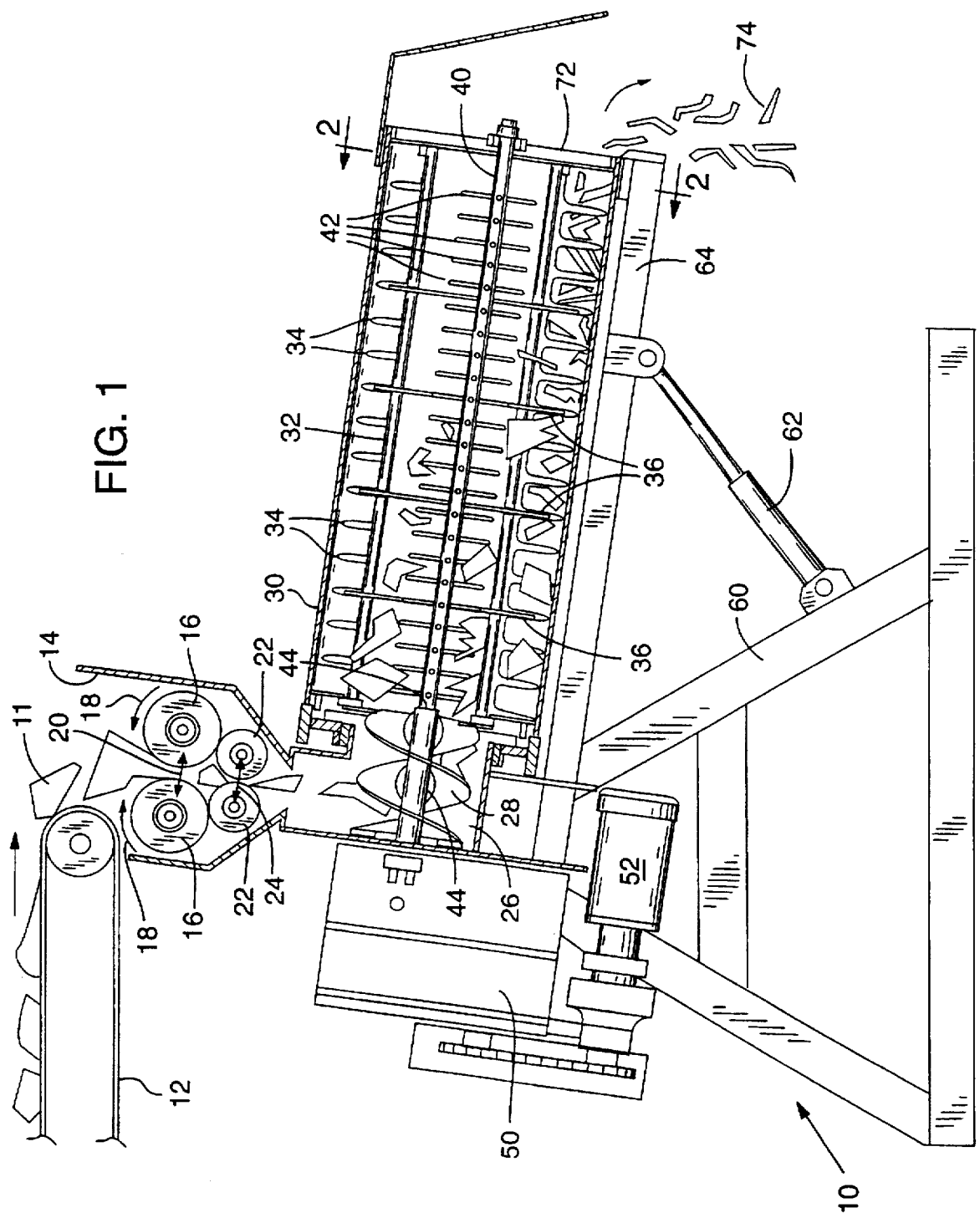
FIG. 1 is a view of a meat pulling apparatus.

Refer now to FIG. 1 of the drawings which illustrates a meat product pulling apparatus 10 of the present invention. An in feed conveyor 12 conveys a cooked meat product 11 such as beef, pork or poultry that is to be separated into individual muscle strands (fibers) to a hopper 14. Rotatably mounted in the hopper 14 are a pair of feed rollers 16 which rotate counter to each other as indicated by the directional arrows 18. The feed rollers 16 are further adjustably mounted to be moved toward and away from each other as indicated by arrow 20. The distance between the feed rollers 16 may be adjusted to suit the size of the food product 11 that is to be pulled or separated into its individual muscle strands. The feed rollers 16 are arranged to controllably feed the food product 11 down through the hopper 14 and into a second set of crush rolls 22. The feed rollers 16 will not only feed the food product 11 but in the process will tend to compress the food product 11 and initiate the separation process. The crush rollers 22 are similarly rotatively and adjustably mounted in the hopper 14. The crush rollers 22 counter rotate as indicated by arrows 18 and further are adjustable toward and away from each other as indicated by arrow 24. The crush rollers 22 are arranged to further compress and squeeze the food product 11 as it is fed from the feed rollers 16 into the crush rollers 22. The food product 11 is then deposited into a feed station 26 of the apparatus 10.

In this embodiment the apparatus 10 has both a feed roller set 16 and a crush roller set 22. This is the general arrangement for processing large chunks of cooked meat. When small chunks of cooked meat, such as chicken breasts, are processed the apparatus may only have a single roller set such a feed roller set 16 or a crush roller set 22.

The feed station 26 has a rotating auger 28 rotatively supported and driven by a transmission 50 in a conventional manner to feed the food product 11 into a rotating drum 30. The drum 30 is rotatively driven by the transmission 50 at a rate that varies slightly from the rotation rate of the auger 28. The drum 30 has a ring gear mounted to the drum which is driven by a pinion mounted to a shaft extending from the transmission 50. The ring gear and pinion are not detailed since this type of drive is well known in the industry.

Longitudinal rakes 32 are mounted to an end of the auger 28 and are rotatively driven within the drum 30 by the rotation of the auger 28. The rakes 32 extend substantially the length of the drum 30. The opposite ends of the rakes are mounted to and are supported by a spider 72 that is rotatively fitted to the exit end of the drum 30. The rakes 32 have a support rib that extends longitudinally along the length of the drum 30. Fingers 34 extend radially outward from the support rib of the rake 32 with the end of the fingers traveling in close proximity to the interior surface of the drum 30. The rakes 32 which rotate at the same rate as the auger 28 provide a continuous wiping or cleaning action for the drum 30 since the rakes 32 rotate at a slightly different rate than the drum 30. The length of the fingers 34 may be varied and the spacing between adjacent fingers 34 may be varied to suit the meat product that is to be separated. The spacing of the fingers 34 of the rakes 32 near the auger 28 may for example be greater than the spacing of the fingers near the spider 72.

Radial baffles (discs) 36 are mounted to the rakes 32 at spaced intervals along the length of the drum 30. The radial baffles 36 have extending fingers 38 (see FIG. 2) that extend toward the interior surface of the drum 30. The spacing between adjacent fingers 38 of the baffles 36 may be varied to suit and in some situations the baffles may not have any fingers 38 extending from the baffle 36.

A puller bar 40 is rotatively mounted in the drum 30 and is coaxial with the auger 28 and the drum 30. The puller bar 40 has radially extending fingers 42 at spaced intervals along the length of the puller bar. A shaft 44 of the puller bar extends through the center of the auger 28 and is coupled to the transmission 50. In this embodiment, the puller bar 40 has radially extending fingers 42 spaced at intervals along the length of the bar 40 with a finger extending radially at each quadrant, that is at 90 degree intervals. It will be appreciated that the spacing between the fingers 42 along the length of the bar 40 may be varied as well as the angular position of the fingers 42 extending from the bar 40.

As previously mentioned, the auger 28, the drum 30 and the puller bar 40 are rotatively driven in a conventional manner by a transmission (gear box) 50. The transmission 50 is powered by a motor 52. The auger 28 and the drum 30 are rotated substantially at the same rate with the drum 30 preferably rotating at a slightly different rate than the auger 28. The puller bar 40 is driven at a very high rate of rotation as compared to the auger 28 and/or the drum 30. The rakes 32 and the baffles 36 which are coupled by mounting to the auger 28 rotate at the same rate as the auger 28. The direction of rotation of the auger 28 (and rakes 32, baffles 36) and the drum 30 is indicated by arrow 31 and the direction of rotation of the puller bar 40 is indicated by arrow 41 in FIG. 2.

As the food product 11 falls into the entry area 26 and is engaged by the auger 28, the auger 28 will transport the food product 11 into the rotating drum 30. The radial baffles 36 are provided to prevent the food product 11 from initially progressing too far along the length of the drum 30 and thus will impede the rate of travel of the food product 11 along the drum 30. The drum 30 is inclined at an angle and therefore the food product 11 initially delivered to the drum 30 will tend to slide along the surface of the drum 30 between the rakes 32. The rakes 32 as they rotate will engage and lift the food product 11 upwardly and as the food product is elevated, the rakes will reach an angle of inclination such that the food product 11 will slide off the rakes 32 due to gravity and will fall into the rotational path of the rotating puller bar 40. As the food product 11 falls into the highly rotating puller bar 40, the extending fingers 42 will engage the food product 11 and will in the process separate the food product into its individual muscle fiber strands 74. Additionally the fingers 42 will propel the product against the surface of the drum 30.

The strands 74 which are separated from the food product 11 will sift through the extending fingers 34 of the rakes 32 and the extending fingers 38 of the radial baffles 36 as the fingers 34 engage and lift the strands 74. The strands as they are lifted and sift through the fingers 34 will progress toward the exit end of the drum 30 due to the inclination of the drum 30. The fingers 34 of the rakes 32 and the fingers 38 of the baffles 36 as a screen member for separating the individual strands 74 from the larger remaining piece(s) of the product 11.

The larger pieces of product 11 will be elevated again by the rakes 32 to discharge the pieces onto the rotating puller bar 40 and the fingers 42 will again engage the pieces 11 to separate the food product 11 into individual strands 74 and propel the food product 11 against the surface of the drum 30.

The drum 30 is adjustably mounted on the frame 60 of the apparatus 10. A cylinder 62 mounted to the frame 60 of the apparatus 10 and a supporting frame 64 of the drum assembly 30 is provided to tilt the angle of inclination of the drum 30. The angle of the drum 30 is adjusted to adjust the rate of travel of the food product 11 through the drum 30.

Figure 2:
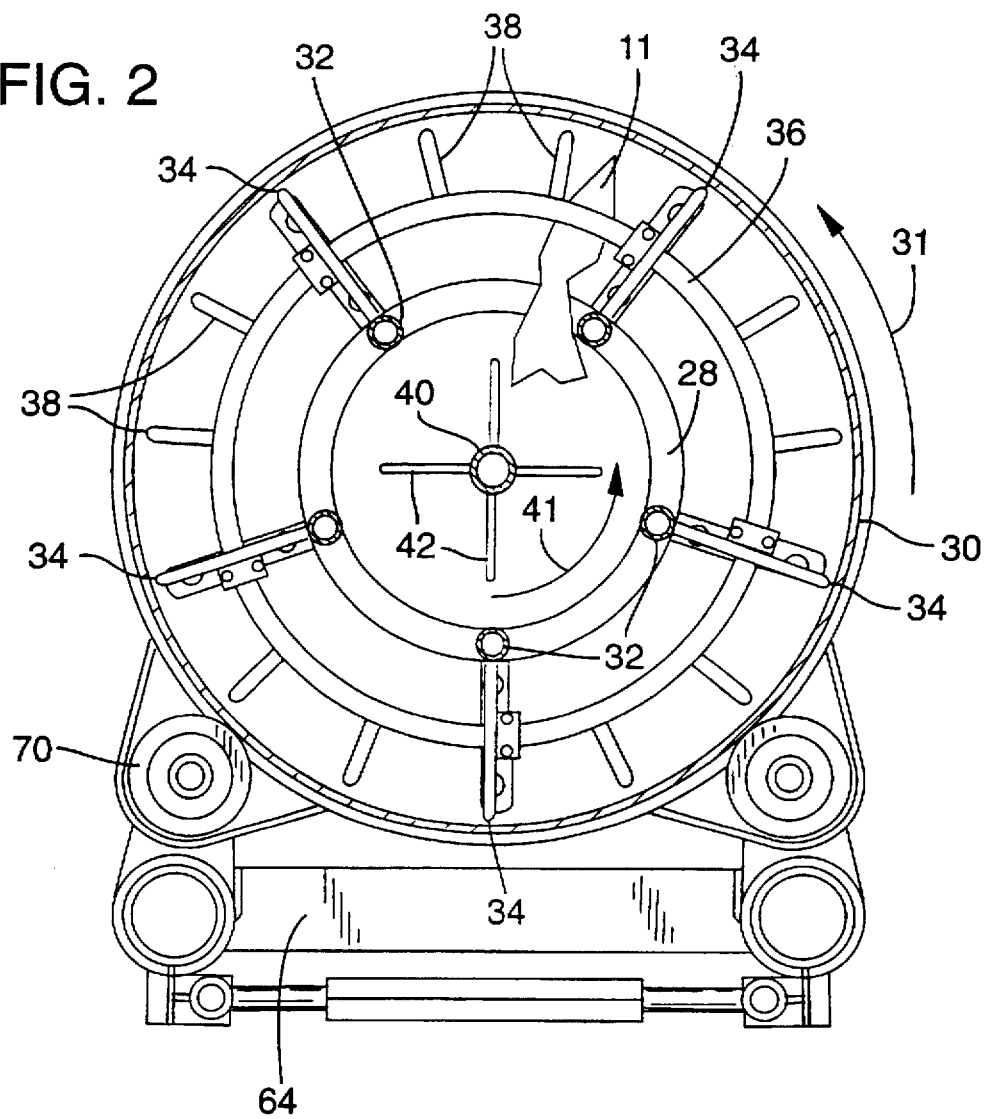
FIG. 2 is an end view of the meat pulling apparatus of FIG. 1 as viewed along view lines 2—2.

The drum 30 is rotatably supported on rollers 70 as shown in FIG. 2. The rollers 70 are mounted to and extend from the frame 64. The end of the puller bar 40 is rotatively supported and the rakes 32 are supported at the end of the drum 30 by a support bracket (spider) 72 (FIG. 1) mounted to the drum 30. The radial baffles 36 are mounted to the rakes 32 by fasteners in a conventional manner.

The meat pulling apparatus 10 is particularly suited for continuous pulling of a quantity of a food product 11. It is also suited for batch processing where a limited amount or set amount of food product is to be pulled. In either situation the food product 11 is pulled and discharged as fibers 74 out of the discharge end of the drum 30.

Figure 3:
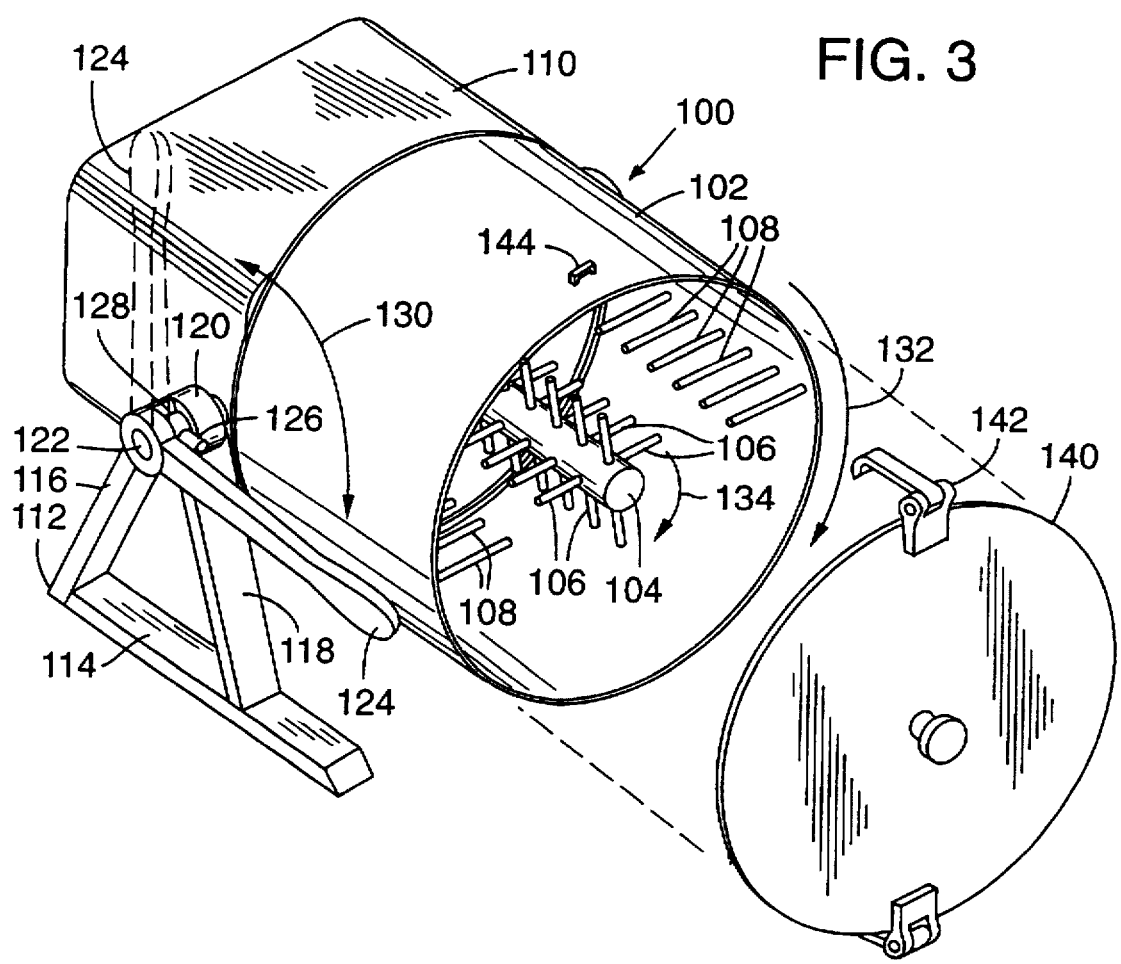
FIG. 3 is a view of a rotating drum type meat pulling apparatus.

Another embodiment of a meat pulling apparatus 100 is illustrated in FIG. 3. The apparatus 100 is a drum type unit having a rotating drum 102. Rotatably mounted in the center of the drum 102 is a beater bar 104. The bar 104 has radially extending fingers 106 positioned along its length. In this embodiment, the drum 102 has two sets of fingers 108 extending radially inward from the drum surface with one set of fingers being on one side of the drum and the other set on the opposite side of the drum. The drum 102 and the beater bar 104 are rotatably supported on a housing 110.

The housing 110 is pivotally mounted on a stand 112. The stand 112 has a base 114 from which legs 116 and 118 extend. The upper ends of the legs 116 and 118 support a journal 120. A shaft 122 of the housing 110 is pivotally mounted in the journal 120. A handle 124 is fixedly mounted on the end of the shaft 122 and is arranged with tabs 126 that engage a stop block 128. The housing 110 (and drum 102) are pivotally adjustable on the stand 112 by the handle 124 between a vertical position and a horizontal position as indicated by arrow 130.

The housing 110 houses a conventional drive motor and a suitable transmission device to rotatively drive the drum 102 and the beater bar 104. The drive is not detailed since there are many known drives in the industry. In this embodiment the drum 102 is driven in the rotative direction indicated by arrow 132 at the rate of about twenty revolutions per minute. The beater bar 104 is rotatively driven in the direction indicated by arrow 134 at the rate of about 1750 revolutions per minute. The beater bar 104 is thus driven at a much higher rate than the drum 102.

A cover 140 is provided for the open end of the drum 102. The cover 140 is of the type that may be secured to the drum 102 such as by latches 142 that engage clips 144 on the drum 102. It will be appreciated that other forms of attachment may be utilized to secure the cover 140 to the open end of the drum 102.

The meat pulling apparatus 100 is pivoted to the vertical position for loading a quantity of a meat product that is to be pulled. The cover 140 is removed and a quantity of meat product is placed in the drum 102. The cover 140 is secured to the end of the drum 102 and the meat pulling apparatus is pivoted to the horizontal position. The drive motor in the housing 110 is energized to drive the drum 102 and the beater bar 104. As the drum 102 rotates the fingers 108 will engage the food product within the drum to elevate the food product along the periphery of the drum. The food product as it is elevated will slide off the fingers 108 and will descend into the rotational path of the fingers 106 of the beater bar 104. The fingers 106 of the beater bar 104 impacting the meat product will separate the meat product into individual strands or fibers and propel the product against the interior of the drum surface. The fingers 108 will continue to transport and elevate the large pieces of meat product to once again be delivered into the path of the rotating fingers 106 of the beater bar 104. The small pieces of meat product that have been separated into the small fibers or strands will pass through adjacent fingers 108 and thus remain out of the rotational path of the beater bar 104. When the meat product has been pulled into individual strands, the motor drive is shut off. The cover 140 is then removed and the pulled meat product is removed from the drum 102.

Figure 4:
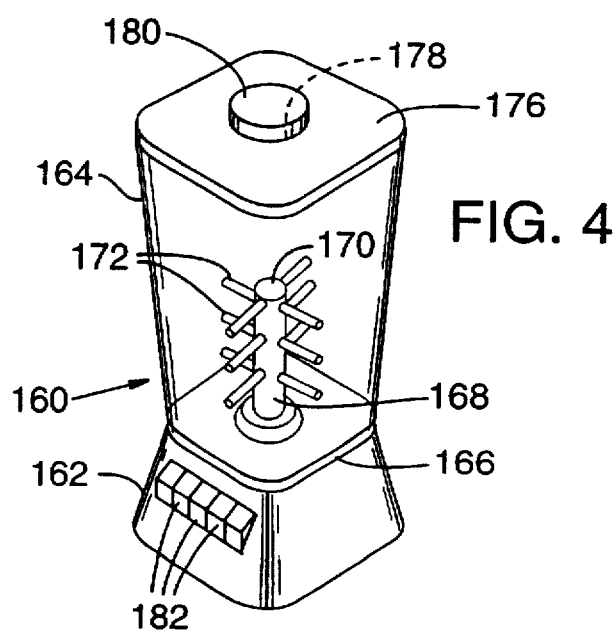
FIG. 4 is a view of another embodiment of a drum type meat pulling apparatus.

FIG. 4 illustrates another meat pulling apparatus 160 that is suited for pulling small quantities of a meat product. The apparatus 160 has a base 162 that houses a drive motor and supports a container (drum) 164. The container has a removable bottom 166 which is utilized to secure the container 164 to the base 162. A beater bar 168 is rotatably mounted in the bottom 164 and is arranged to engage an output shaft of the drive motor in a conventional manner when the container 164 is placed on the base 162.

The beater bar 168 has a vertical shaft 170 that extends upward from the bottom 166. Protruding radially from the shaft 170 are fingers 172. The fingers 172 are in a spaced relation vertically on the shaft 170 and extend from each quadrant.

A removable lid 176 is provided for the top of the container 164. The lid 176 has a center opening 178 and is provided with a cover 180. The motorized drive is controlled by conventional switches 182.

A meat product to be pulled is introduced through the center opening 178. The motorized drive is preferably turned on before meat products are inserted through the opening 178. As the meat product enters the drum 164, it will descend into the rotational path of the beater bar 170 and will be impacted by the fingers 172 to be separated into individual strands or fibers. The separated strands will be propelled against the side of the drum 164 and will fall to the bottom of the drum 164. There is sufficient space below the lowest finger 172 which produces a repository for the separated strands to accumulate without further impact.

Those skilled in the art will recognize that modifications and variations may be made without departing from the true spirit and scope of the invention. The invention is therefore not to be limited to the embodiments described and illustrated, but is to be determined from the appended claims.

What is claimed is:

1. An apparatus for pulling cooked meat product into separated strands, comprising:

a drum for receiving a cooked meat product and having a drum interior defining an axis and a periphery adjacent an inner drum wall;

a set of rakes mounted at the periphery of the drum interior and rotatable about said axis;

a puller bar rotatably mounted at the axis in said drum, said puller bar having radially extended teeth rotating about said axis;

said drum and rakes oriented, and with the rakes in rotation inducing movement of meat product from the interior periphery toward the interior axis, and drive mechanism rotatable driving the rakes to induce said movement of the meat product, and said drive mechanism rotatably driving the puller bar and fingers at a rate whereby food product movement toward the axis produces impact of the food product by the fingers for separation of the food product into strands.

2. An apparatus as defined in claim 1, wherein:
said drum is rotatable.

3. An apparatus as defined in claim 2, further including:
radial baffles mounted at intervals along the length of the drum, said baffles attached to said rakes.

4. An apparatus as defined in claim 3, wherein:
said rakes have extending teeth at spaced intervals along the length of said rakes.

5. An apparatus as defined in claim 4, wherein:
said baffles have extending teeth at spaced intervals.

6. An apparatus as defined in claim 5, further including:
said drum adjustably inclinable.

7. An apparatus as defined in claim 6, further including:
an auger for feeding said food product into said drum.

8. An apparatus as defined in claim 7, further including:
a roller set for controllably feeding said food product to said auger.

9. An apparatus for pulling cooked meat product into separated strands, comprising:

a cylindrical drum having a longitudinal axis and an inner drum wall, one end of said drum configured to receiving a cooked meat product, and a mounting device mounting said drum at an angle downwardly from said one end to an opposite end defining a food product exit;

a set of rakes rotatably mounted in said drum, said rakes having a support rib extending longitudinally along the length of said drum with fingers extended radially from said support rib toward the inner drum wall;

a puller bar having radially extended fingers rotatably mounted at the axis in said drum, said puller bar arranged to rotate at a higher rate of rotation than said rakes;

wherein said product received in said drum is lifted by said fingers of said rakes in a rotational path around the inclined axis of the drum to be gravitationally delivered into the rotational path of said puller bar whereat said product is separated into fibers and in the process moved down the incline of the drum surface.

10. An apparatus as defined in claim 9 wherein a hopper is mounted relative to said drum for receiving food product and directing the food product through the hopper to said one end of the drum, and compression rollers mounted in said hopper for compressing the food product as the food product is directed through the hopper.

11. An apparatus as defined in claim 9 wherein said drum is rotatable in the same direction as said rakes to cooperatively lift the food product.

12. An apparatus as defined in claim 11 including spaced baffles mounted to said rakes provided with fingers spaced apart to define a screen member for inhibiting transfer through the drum of oversized meat product for inducing repeat feeding of the meat product to the puller bars.

13. An apparatus as defined in claim 11 wherein said drum is rotated at a rate different than the rake rotation to produce a relative wiping action of the food product from the interior drum wall.

14. A method of pulling meat product pieces into separated strands which comprises:
(a) directing the meat product pieces through compression rollers;
(b) providing a cylindrical drum defining an axis and mounted at a downward angle from one end to the other;
(c) providing a rotating puller bar extended along the angled axis inside the drum; and
(d) providing a rotatable lift member rotatable around the drum axis inside the drum and surrounding the puller bar, said lift member rotatably and repeatedly lifting the food product pieces from a lower position in the drum to a raised position angularly directed downwardly as dictated by the declining axis of the drum and through the effect of gravitation dropping the food product into the rotating puller bar for tearing the food product pieces into strands of meat product as the meat product is moved toward the other end.

15. An apparatus as defined in claim 1, further including:
a mounting member adjustably mounting said drum between a vertical position for loading and a horizontal position for separating said product as a batch process.

16. An apparatus as defined in claim 15 wherein;
fingers extend radially inward from the inner surface of said drum and are rotatable with said drum to provide said rakes.

17. An apparatus for pulling cooked meat product into separated strands, comprising;
a motor member, a container having an interior defined by an interior wall, an open top and a bottom, the bottom mounted to said motor member and a rotatable drive extended from the motor member and accessible to the interior of said container;

a beater bar member sized and configured to fit the interior of said container and attachable to said motor member drive, said beater bar member including an elongated vertical shaft engaging said drive for rotatable driving of the beater bar member, and lateral non-sharpened beater bars located in spaced apart relation both rotatably and vertically on the vertical shaft and spaced from the bottom to provide thereat a repository for separated strands, said open top, interior wall and beater bars providing a pathway into which meat product is inserted into the container and caused to flow downward through the beater bars, the beater bars being rapidly rotated to separate the meat product into separated strands while passing down through the beater bars to be deposited as separated strands at the repository.

18. An apparatus as defined in claim 17 wherein a first pair of said beater bars are positioned at 180 degree intervals rotatably on said shaft and including a similar second pair of beater bars spaced vertically from said first pair of bars and offset rotatively from said first pair of bars, the lower of said pair of bars spaced above the container bottom and defining a space for deposit of the separated fibrous strands.

\* \* \* \* \*